United States Patent
Singh et al.

(10) Patent No.: US 9,020,504 B1
(45) Date of Patent: Apr. 28, 2015

(54) CONDITIONING REGISTRATION IN A RADIO ACCESS NETWORK ON DETECTING COVERAGE OF OTHER RADIO ACCESS NETWORK

(71) Applicant: Sprint Spectrum L.P., Overland Park, KS (US)

(72) Inventors: Jasinder P. Singh, Olathe, KS (US); Eshwar Narava, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 56 days.

(21) Appl. No.: 13/759,778

(22) Filed: Feb. 5, 2013

(51) Int. Cl.
*H04W 4/00* (2009.01)
*H04W 60/00* (2009.01)

(52) U.S. Cl.
CPC ............................. *H04W 60/00* (2013.01)

(58) Field of Classification Search
USPC ........ 455/458, 432.1, 436, 434, 435.1, 552.1, 455/456.1; 370/335, 331, 279, 252, 318
See application file for complete search history.

(56) References Cited

U.S. PATENT DOCUMENTS

| | | | |
|---|---|---|---|
| 6,549,524 B1 | 4/2003 | Shin | |
| 8,073,441 B1* | 12/2011 | Unger et al. | 455/422.1 |
| 2002/0193139 A1* | 12/2002 | Mildh et al. | 455/552 |
| 2003/0050076 A1* | 3/2003 | Watanabe | 455/456 |
| 2008/0304434 A1* | 12/2008 | Giaretta et al. | 370/313 |
| 2010/0061337 A1 | 3/2010 | Hallenstal et al. | |
| 2010/0172336 A1* | 7/2010 | Pehrsson et al. | 370/338 |
| 2010/0202413 A1* | 8/2010 | Vikberg et al. | 370/332 |
| 2010/0254313 A1* | 10/2010 | Hallenstal et al. | 370/328 |
| 2011/0014919 A1* | 1/2011 | Otte et al. | 455/442 |
| 2011/0110228 A1* | 5/2011 | de Franca Lima et al. | 370/230 |
| 2011/0117911 A1* | 5/2011 | Narang et al. | 455/434 |
| 2011/0117931 A1* | 5/2011 | Hu et al. | 455/456.1 |
| 2011/0141910 A1* | 6/2011 | Rosik | 370/241 |
| 2011/0176414 A1* | 7/2011 | De Franca Lima et al. | 370/230 |
| 2011/0194505 A1* | 8/2011 | Faccin et al. | 370/329 |
| 2012/0015650 A1* | 1/2012 | Pudney et al. | 455/434 |
| 2012/0071163 A1* | 3/2012 | Klingenbrunn et al. | 455/435.2 |
| 2012/0142347 A1* | 6/2012 | Morad et al. | 455/435.1 |
| 2012/0157100 A1* | 6/2012 | Suzuki et al. | 455/435.2 |
| 2013/0183965 A1* | 7/2013 | Ramachandran et al. | 455/434 |

* cited by examiner

Primary Examiner — Mahendra Patel

(57) ABSTRACT

A method and corresponding apparatus to help avoid a scenario where a wireless communication device registers within a first radio access network (RAN) but then fails to transition from that first RAN to engage in a communication on a second RAN. When a WCD detects coverage of the first RAN, the WCD may condition its registration with the first RAN on the WCD also being within coverage of the second RAN.

19 Claims, 5 Drawing Sheets

CONDITIONING REGISTRATION IN A RADIO ACCESS NETWORK ON DETECTING COVERAGE OF OTHER RADIO ACCESS NETWORK

BACKGROUND

Unless otherwise indicated herein, the materials described in this section are not prior art to the claims and are not admitted to be prior art by inclusion in this section.

A typical cellular wireless network includes a number of base stations that radiate to define wireless coverage areas, such as cells and cell sectors, in which wireless communication devices (WCDs) such as cell phones, tablet computers, tracking devices, embedded wireless modules, and other wirelessly equipped communication devices, can operate. In turn, each base station may be coupled with network infrastructure that provides connectivity with one or more transport networks, such as the public switched telephone network (PSTN) and/or the Internet for instance. With this arrangement, a WCD within coverage of the network may engage in air interface communication with a base station and may thereby communicate via the base station with various remote network entities or with other WCDs served by the base station.

In general, a cellular wireless network may operate in accordance with a particular air interface protocol or "radio access technology," with communications from the base stations to WCDs defining a downlink or forward link and communications from the WCDs to the base stations defining an uplink or reverse link. Examples of existing air interface protocols include, without limitation, Code Division Multiple Access (CDMA) (e.g., 1xRTT and 1xEV-DO), Long Term Evolution (LTE), WiMAX, iDEN, TDMA, AMPS, Global System for Mobile Communications (GSM), GPRS, UMTS, EDGE, MMDS, WI-FI, and BLUETOOTH. Each protocol may define its own procedures for registration of WCDs, initiation of communications, handoff between coverage areas, and functions related to air interface communication.

In accordance with the air interface protocol, each coverage area may operate on one or more carrier frequencies and may define a number of air interface channels for carrying information between the base station and WCDs. These channels may be defined in various ways, such as through frequency division multiplexing, time division multiplexing, and/or code-division multiplexing for instance.

By way of example, each coverage area may define a pilot channel, reference channel or other resource on which the base station may broadcast a pilot signal, reference signal, or the like that WCDs may detect as an indication of coverage and may measure to evaluate coverage strength. As another example, each coverage area may define an uplink control channel or other resource on which WCDs may transmit control messages such as registration requests and access requests to the base station. And each coverage area may define a downlink control channel or other resource on which the base station may transmit control messages such as system information messages and page messages to WCDs. Each coverage area may then define one or more traffic channels or other resource for carrying communication traffic such as voice data and other data between the base station and WCDs.

When a WCD first powers on or enters into coverage of the network, the WCD may scan for and identify a strongest pilot or reference signal and may register with the network by transmitting a registration request or attach request to a base station providing that signal. This registration process may serve to notify the network of the WCD's presence in a particular coverage area and to facilitate network authentication of the WCD. Once registered, the WCD may then operate in an idle mode in which the WCD monitors a downlink control channel to receive overhead information and to check for any page messages. In the idle mode, the WCD may have no assigned traffic channel resources on which to engage in bearer communication.

When the network has a communication (such as a voice call or other traffic) to provide to a WCD that is registered with the network but is operating in the idle mode, the network may page the WCD in an effort to then facilitate assigning traffic channel resources to the WCD. In particular, the network may transmit on the downlink a page message addressed to the WCD. Assuming the WCD receives this page message, the WCD may then transmit to the network a page response message on the uplink. And upon receipt of the page response message, the network may then assign traffic channel resources to the WCD, for use to carry the communication, thus transitioning the WCD to a connected or active mode in which the WCD can engage in the communication.

Likewise, when an idle WCD seeks to initiate a communication (such as to place a voice call or engage in other bearer communication), the WCD may transmit on the uplink to the base station an origination or connection request, and the network may then assign traffic channel resources to the WCD for use to carry the communication, similarly transitioning the WCD to a connected or active mode in which the WCD can engage in the communication.

Overview

In systems that provide service under more than one air interface protocol, service providers may implement functionality that allows WCDs to operate by default on one air interface protocol and to dynamically switch over to operate on another air interface protocol when necessary to engage in certain communications. By way of example, in a system that supports both LTE service for mobile broadband and an older protocol such as CDMA or GSM for traditional voice calls, service providers may implement "circuit switched fallback" (CSFB) functionality, which allows WCDs to operate by default on LTE and to switch over to operate on CDMA or GSM to engage in voice calls.

Under CSFB, for instance, a hybrid CDMA/LTE WCD may be arranged by default to scan for and register with an LTE network and to operate with its CDMA radio powered off, but to then engage in control signaling with the CDMA network via the LTE network, i.e., over the LTE air interface. To facilitate this, when the WCD registers with the LTE network, LTE network infrastructure such as a mobility management entity (MME) may signal through an interworking server (IWS) with the CDMA network to register the WCD with the CDMA network as well.

In turn, when the CDMA network has a voice call to connect to the WCD, the CDMA network may signal through the IWS to the LTE network to cause the LTE network to send a CSFB page message to the WCD over the LTE air interface. And upon receipt of that CSFB page message, the WCD may responsively turn on its CDMA radio and tune to the CDMA network to engage in the call over the CDMA air interface.

In one implementation of this process, for instance, the WCD may respond to the CSFB page message by scanning for and identifying CDMA coverage and signaling over CDMA to the CDMA network, the CDMA network may then transmit over CDMA to the WCD a CDMA traffic channel assignment, and the WCD may then engage in the call on the assigned CDMA traffic channel. Alternatively, in another implementation, the WCD may transmit a CSFB page response over LTE to the LTE network, the LTE network may pass that page response through the IWS to the CDMA network, the CDMA network may then provide a CDMA traffic channel assignment to the LTE network, the LTE network may transmit that CDMA traffic channel assignment over LTE to the WCD, and the WCD may then tune to the CDMA network and engage in the voice call on the assigned CDMA traffic channel.

Likewise, when the WCD is served by the LTE network and has a voice call to place, the WCD may transmit over the LTE air interface to the LTE network a CSFB origination request, and the LTE network may pass that origination request through the IWS to the CDMA network. The WCD may then scan for and signal over CDMA to the CDMA network, receive over CDMA a CDMA traffic channel assignment, and engage in the call over CDMA. Alternatively, CDMA network may provide a CDMA traffic channel assignment to the LTE network, the LTE network may transmit that CDMA traffic channel assignment over LTE to the WCD, and the WCD may then tune to the CDMA network and engage in the voice call on the assigned CDMA traffic channel.

This CSFB process assumes as a basic matter that the WCD is in coverage of both the LTE network and the CDMA network with which the LTE is connected, so that, not only can the WCD may engage in call setup signaling with the CDMA network over the LTE air interface (and through the connection between the LTE network and the CDMA network), but the WCD may then also successfully transition to engage in the voice call on the CDMA air interface.

In some situations, however, this may not be the case.

In particular, depending on the configuration and coverage of the LTE network and the CDMA network, there could be a situation where the coverage of the LTE network and coverage of the associated CDMA network do not fully coincide and, particularly, where the LTE network covers an area that the associated CDMA network does not cover. With that situation, a WCD could be in coverage of the LTE network but not within coverage of the associated CDMA network. The WCD may thus detect the presence of the LTE network and register with the LTE network, and the LTE network may signal with the CDMA network to register the WCD with the CDMA network as well. Further, the WCD may then engage in call setup signaling with the CDMA network over the LTE air interface to set up a voice call. However, when the WCD then tries to tune to the CDMA network to receive a traffic channel assignment or to engage in the voice call, the process will fail, because the WCD is not within coverage of the CDMA network.

Disclosed herein is a method and corresponding apparatus to help avoid this problem. In accordance with the method, when a WCD detects coverage of a particular network (e.g., an LTE network), the WCD will condition its registration with that network on the WCD also detecting coverage of another network (e.g., a CDMA network). In other words, the WCD will attempt registration with the particular network only if the WCD also determines that the WCD is within coverage of the other network, and otherwise the WCD may forgo registration with the particular network.

In the above CSFB arrangement, for instance, when the WCD detects that it is within coverage of the LTE network, the WCD may condition its attempt to register with the LTE network on a determination that the WCD is also currently within coverage of the CDMA network. If the WCD determines that it is not also currently within coverage of the CDMA network, then the WCD may forgo registration with the LTE network (and may instead simply scan for other CMDA coverage and register directly with a CDMA network). Whereas, if the WCD determines that it is also currently within coverage of the CDMA network, then the WCD may register with the LTE network, which would trigger the associated CDMA registration process and allow other CSFB functionality as discussed above.

Accordingly, in one respect, disclosed is a method that involves a WCD detecting that the WCD is within coverage of a first radio access network (RAN) and, responsive to detecting that it is within coverage of the first RAN, the WCD registering with the first RAN only if the WCD is also within coverage of a second RAN. In particular, the method may also involve the WCD making a determination of whether the WCD is also within coverage of the second RAN, and, responsive to detecting that it is within coverage of the first RAN, the mobile station registering with the first RAN (e.g., transmitting to the first RAN a request for the first RAN to register presence of the WCD in coverage of the first RAN) only if the determination is that the WCD is also within coverage of the second RAN.

In another respect, disclosed is a WCD that comprises a wireless communication interface arranged to exchange communications wirelessly with both a first RAN and a second RAN, with the WCD being arranged to scan for and detect coverage of the first RAN and, responsive to detecting coverage of the first RAN, to register with the first RAN only if the WCD determines that the WCD is also within coverage of the second RAN. And likewise, the WCD (e.g., the wireless communication interface) may be arranged to scan for coverage of the second RAN so as to determine whether the WCD is also within coverage of the second RAN, so as to facilitate deciding whether to register with the first RAN.

Still further, in another respect, disclosed is a method carried out by a WCD to condition registration with a first network on the WCD detecting coverage of a second network. In particular, the method may involve the WCD scanning for coverage of a first network and detecting the coverage of the first network. Further, the method may involve, upon detecting the coverage of the first network, the WCD wirelessly receiving from the first network an indication that the first network supports circuit-switched fallback. And the method may then involve, responsive to receipt of the indication that the first network supports circuit-switched fallback, the WCD scanning for coverage of a second network and (i) if the WCD detects coverage of the second network while the WCD is still within coverage of the first network, then the WCD registering with the first network and then registers through the first network with the second network, but (ii) if the WCD does not detect coverage of the second network, then the WCD not registering with the first network.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

As noted above, FIG. 1 is a simplified block diagram of a network arrangement in which an exemplary embodiment of the present method and apparatus can be implemented. It should be understood, however, that this and other arrangements and processes described herein are set forth for purposes of example only, and that other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location.

Figure 1:
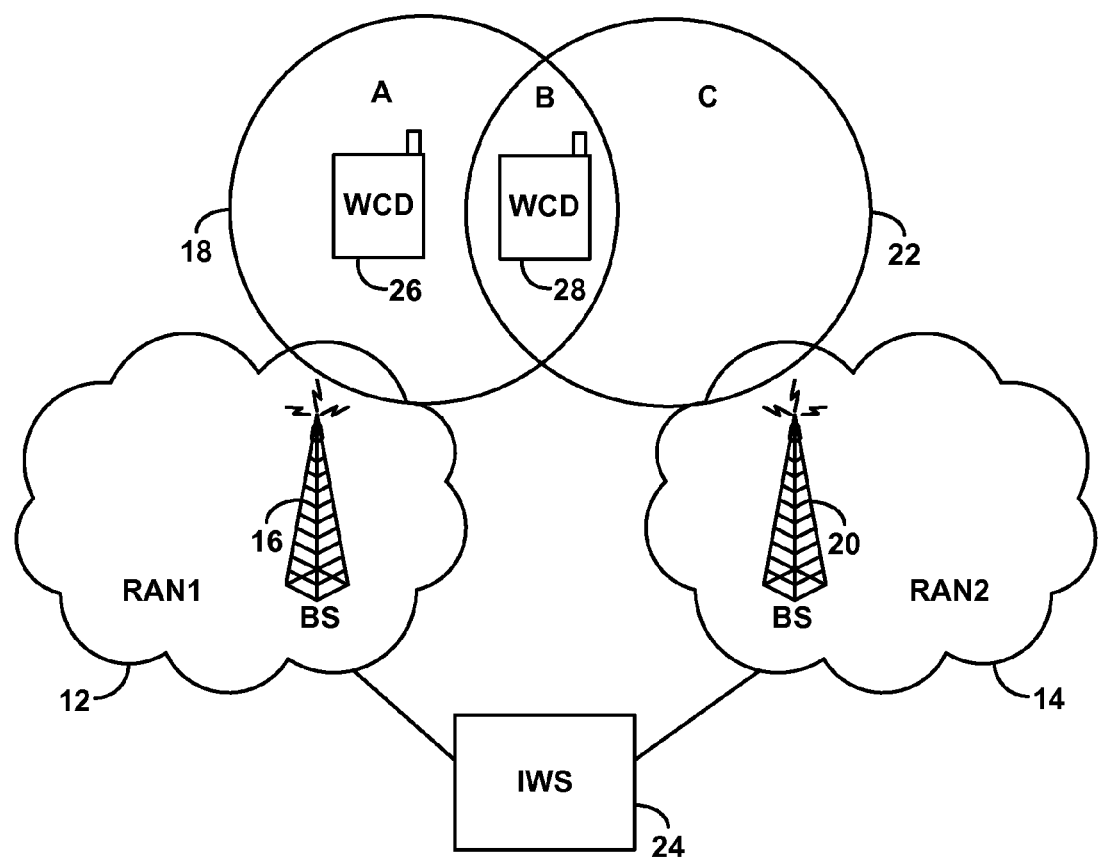
FIG. 1 is a simplified block diagram of a network arrangement in which an exemplary embodiment of the present method and apparatus can be implemented.

The arrangement of FIG. 1 includes by way of example two representative radio access networks (RANs) 12, 14, each of which may function to provide WCDs with air interface coverage and connectivity with one or more transport networks such as the PSTN and the Internet. As shown in the figure, RAN 12 includes a representative base station 16 radiating to provide a respective coverage area 18 defining an air interface through which to exchange control and bearer data with WCDs, and RAN 14 includes a representative base station 20 radiating to provide a respective coverage area 22 defining an air interface through which to exchange control and bearer data with WCDs. Although only one representative base station and coverage area is shown per RAN, the RANs could include more than one base stations cooperatively defining a coverage area or multiple coverage areas.

As shown in the figure, the coverage area 18 of RAN 12 and the coverage area of RAN 14 do not fully coincide. In particular, with the arrangement shown, coverage areas 18 and 22 overlap with each other only partially, thus defining an area A having coverage of just RAN 12, and area B having coverage of both RAN 12 and RAN 14, and an area C having coverage of just RAN 14. With this arrangement, if a WCD is within area A, the WCD would be within coverage of RAN 12 but not within coverage of RAN 14, if a WCD is within area B, the WCD would be within coverage of both RAN 12 and RAN 14, and if a WCD is within area C, the WCD would be within coverage of RAN 14 but not within coverage of RAN 12. FIG. 1 depicts two representative WCDs 26, 28, one in area A, and the other in area B.

As further shown, RAN 12 and RAN 14 are communicatively linked together through a representative intermediary such as an IWS 24 that facilitates exchange of signaling and perhaps other information between the RANs. In practice, for instance, the illustrated base station of each RAN may be in communication with back-end network infrastructure, which may be in turn be in communication with the IWS. Thus, registration and call setup signaling could be exchanged between the RANs, to support functionality such as CSFB for instance.

RAN 12 and RAN 14 may be owned and operated by a common wireless service provider, and the service provider may configure the RANs to interwork with each other (or may arrange for the IWS to associate the RANs with each other) so as to facilitate CSFB for instance. Alternatively, the RANs may be owned and/or operated by separate wireless service providers, and those service providers may have an agreement with each other to allow for interworking between the networks, again to facilitate CSFB or the like.

In practice, a service provider may configure RAN 12 to respond to a registration request received from a WCD in coverage area 18 by not only registering the WCD as being in that coverage area of RAN 12 but also signaling to the IWS to trigger registration of the WCD with RAN 14 as well. Further, a service provider may configure RAN 14 to receive and record such a registration and, when necessary to page the WCD for a call that will be served by RAN 14 in coverage area 22, to transmit a page message to the IWS so as to trigger paging of the WCD by RAN 12 and ultimately transition of the WCD to take the call over the air interface of coverage area 22. Further, the RANs may be configured in additional ways to support CSFB or the like.

With the arrangement shown in FIG. 1, WCD 28 is positioned in coverage of both RAN 12 and RAN 14, and so this interworking process may work well for WCD 28. In particular, WCD 28 may scan for and detect coverage of RAN 12 and may responsively register with RAN 12 by transmitting in coverage area 18 to base station 16 a registration request. In response, RAN 12 may then record the fact that WCD 28 is present within coverage area 18 served by base station 16, so as to facilitate paging WCD 28 for calls or the like. Further, given the association between RAN 12 and RAN 14, RAN 12 may also responsively signal to IWS 24 to trigger registration of WCD 28 with RAN 14. WCD 28 may then idle in coverage area 18 of RAN 12.

When RAN 14 has a call to connect to WCD 28, RAN 14 may then send a page message (or page message trigger) to IWS 24 to trigger paging of WCD 28. RAN 12 may then responsively page WCD 28 by having base station 16 transmit a page message to WCD 28 in coverage area 18. In line with the example CSFB procedures described above, this may then lead to RAN 14 assigning to WCD 28 an air interface traffic channel in coverage area 22 served by base station 20, and WCD 28 transitioning to be served in coverage area 22 by base station 20 and to engage in the call over the assigned air interface traffic channel.

On the other hand, however, with the arrangement shown, WCD 26 is positioned in coverage of RAN 12 but not within coverage of RAN 14. Nevertheless, RAN 12 and RAN 14 may still be associated with each other as described above. Consequently, although registration and call setup signaling can pass between the RANs, the WCD will not be able to transition to be served in coverage area 22 of RAN 14, and so the interworking process may fail.

In particular, as with WCD 28, WCD 26 may scan for and detect coverage of RAN 12 and may responsively register with RAN 12 by transmitting in coverage area 18 to base station 16 a registration request. In response, RAN 12 may then record the fact that WCD 26 is present within coverage area 18 served by base station 16, so as to facilitate paging WCD 26 for calls or the like. Further, given the association between RAN 12 and RAN 14, RAN 12 may also responsively signal to IWS 24 to trigger registration of WCD 26 with RAN 14. WCD 26 may then idle in coverage area 18 of RAN 12.

In turn, when RAN 14 has a call to connect to WCD 26, RAN 14 may then send a page message (or page message trigger) to IWS 24 to trigger paging of WCD 26, and RAN 12 then responsively page WCD 26 by having base station 16 transmit a page message to WCD 26 in coverage area 18.

Further, in an example CSFB implementation for instance, RAN 14 may assign to WCD 26 an air interface traffic channel in coverage area 22 served by base station 20. However, when WCD 26 seeks to transition over to be served in coverage area 22 by base station 20, WCD 26 will not be able to do so, since WCD 26 is not within coverage area 22. Consequently, the process will fail.

Figure 2:
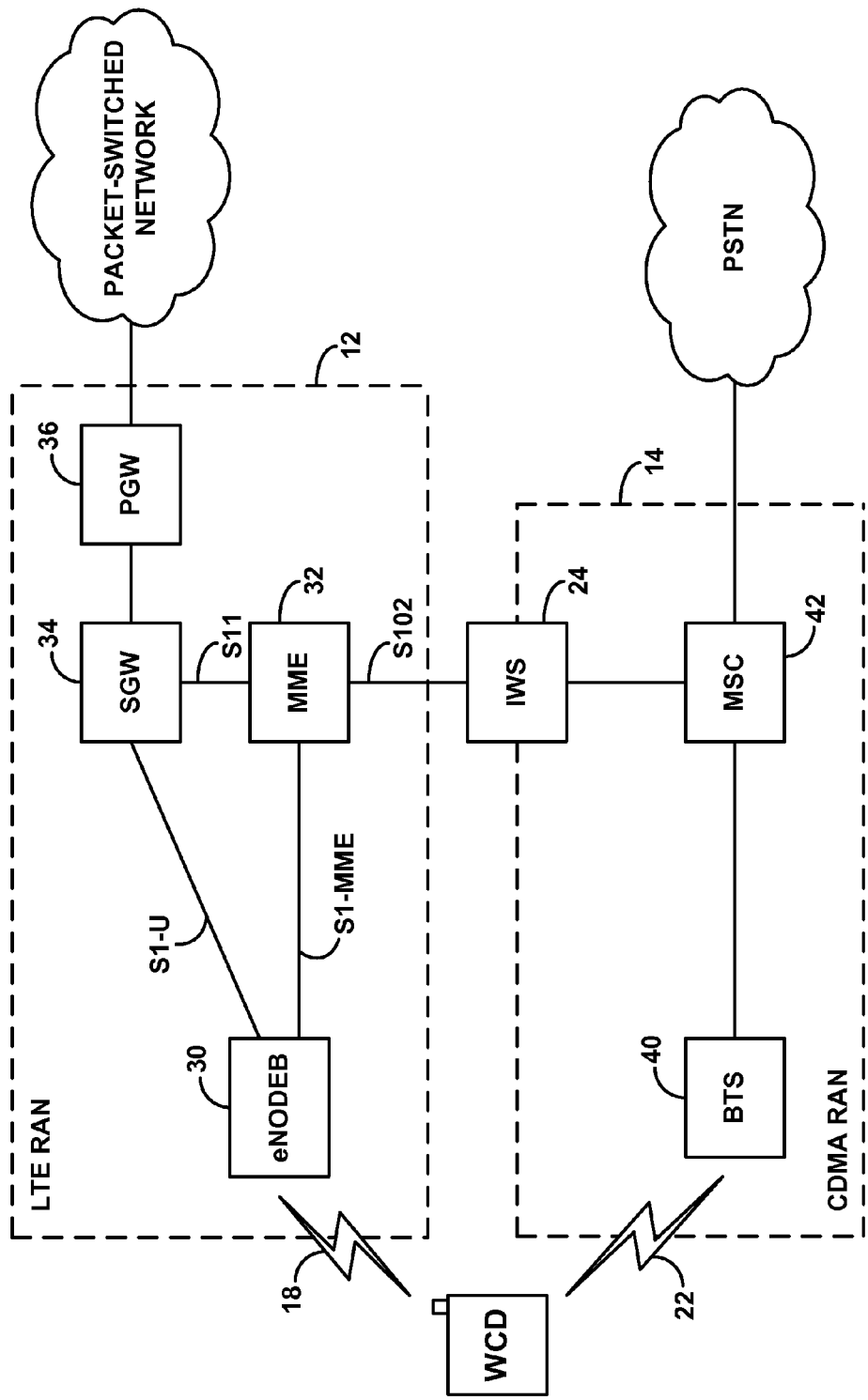
FIG. 2 is a simplified block diagram of a more specific network arrangement in which the exemplary embodiment can be implemented.

FIG. 2 is next a more specific block diagram depicting an example network arrangement like that shown in FIG. 1. In the arrangement of FIG. 2, RAN 12 is an 4G LTE network that primarily serves WCDs with wireless packet data communication service (including perhaps voice-over-packet and other packet-based real-time media service), and RAN 14 is a 3G CDMA network that primarily serves WCDs with circuit-switched voice call service (but may also provide packet-data communication service and other types of service). These networks could take other forms as well, using other protocols such as WiMAX, GSM, or others now known or later developed.

The 4G LTE network 12 in this arrangement is shown including a representative LTE base station 30 known as an eNodeB, which includes an antenna structure and associated equipment for engaging in LTE communication over the air interface of coverage area 18 with WCDs. The eNodeB 30 is then shown coupled with an MME 32 that serves as a signaling controller for the LTE network. Further, the eNodeB is also shown coupled with a serving gateway (SGW) 34, which may then be coupled with a packet-gateway (PGW) that connects with a packet-switched network 36. And the MME is shown coupled with the SGW.

The 3G network 14, on the other hand, is shown including a representative CDMA base station 40 known as a base transceiver station (BTS), which includes an antenna structure and associated equipment for engaging in CDMA communication over the air interface of coverage area 22 with WCDs. The BTS is then shown in communication (possibly through a base station controller (BSC) (not shown)) with a mobile switching center (MSC) 42 that functions to manage paging over the CDMA air interface and to provide connectivity with the PSTN.

Further shown in FIG. 2 is then the IWS 24, which functions to facilitate interworking between the LTE network 12 and the CDMA network 14 as discussed above, so as to facilitate CSFB functionality for instance.

In practice with this LTE/CDMA arrangement, the LTE eNodeB 30 may broadcast an overhead signal such as a System Information Block #8 (SIB8) that includes data that a recipient WCD may programmatically interpret to mean that the LTE coverage area in which the overhead signal is broadcast is one that supports CSFB functionality. Assuming the WCD shown in the figure is capable of engaging in CSFB, the WCD may detect this broadcast signal and may responsively opt to register in coverage area 18 with the LTE network. Under LTE principles, the WCD may do so by transmitting an attach request to the eNodeB 30, including in the attach request data that indicates capabilities of the WCD and particularly an indication that the WCD supports CSFB functionality.

Upon receipt of this attach request, the LTE network may register presence of the WCD in coverage area 18 of eNodeB 30. For instance, eNodeB 30 may signal to MME 32 to trigger this registration. Further, in response to the attach request indicting that the WCD supports CSFB functionality, MME 32 may also signal to IWS 24 to trigger registration of the WCD with the CDMA network. In particular upon receipt of the signal from MME 32, IWS 24 may signal to MSC 42, and the MSC (in cooperation with a home location register and/or other network infrastructure) may register the fact that the WCD is currently served by the LTE network.

When the MSC receives a request to connect a call to the WCD, the MSC may then send to the IWS a page request, and the IWS may in turn signal to the MME. The MME may then signal to the eNodeB to trigger paging of the WCD over the LTE air interface. And in line with the discussion above, the WCD should optimally then transition over to be served by BTS 40 in coverage area 22 of the CDMA network and to engage in the call over CDMA.

Figure 3:
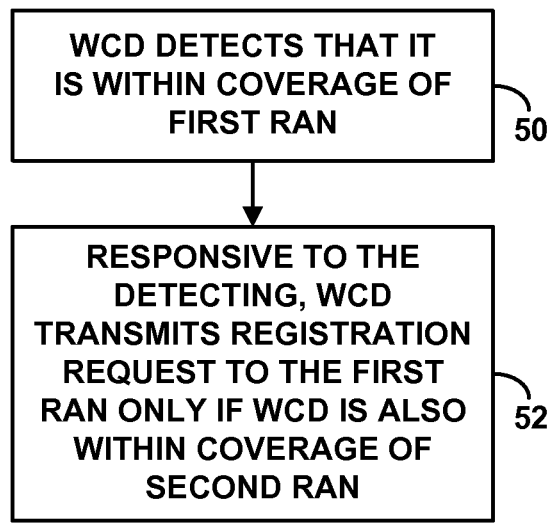
FIG. 3 is a flow chart depicting functions that can be carried out in accordance with an example method.

FIG. 3 is next a flow chart depicting functions that a representative WCD can carry out to help avoid the scenario where the WCD registers with RAN 12 (e.g., the LTE network) when WCD is not within coverage of associated RAN 14 (e.g., the CDMA network), as that scenario could result in failure of call setup as discussed above.

As shown in FIG. 3, at block 50, the method involves a WCD detecting that the WCD is within coverage of a first RAN, and at block 52, the method then involves, responsive to that detecting, the WCD registering with the first RAN only if the WCD is also within coverage of a second RAN. With this method, the WCD may thus register with the first RAN (e.g., wirelessly transmit to the first RAN a request for the first RAN to register presence of the WCD in coverage of the first RAN, among possibly other steps) if the WCD is also within coverage of the second RAN, but may forgo registering with the first RAN (e.g., not wirelessly transmitting to the first RAN a registration request) if the WCD is not also within coverage of the second RAN.

To carry out this method in practice, the WCD may make a determination of whether the WCD is also within coverage of the second RAN and may then register with the first RAN only if the determination is affirmative. Further, a trigger for the WCD applying this condition may be the WCD receiving a broadcast from the first RAN (e.g., a SIB8 signal) indicating that the first RAN supports CSFB functionality or the like—such that if the WCD registers with the first RAN, the first RAN would also trigger registration of the WCD with the second RAN. Thus, the WCD may receive from the first RAN a signal indicating that the first RAN supports WCD registration with the second RAN through the first RAN, and, in response to receipt of such a signal, may then work to determine whether it is also within coverage of the second RAN.

To determine whether it is within coverage of the second RAN (that is associated with the first RAN for CSFB functionality for instance), the WCD may scan for broadcast of a particular RAN identifier or other parameter associated with the second RAN. An example of such an identifier may be a system identifier and/or network identifier (SID/NID). In this regard, in the LTE/CDMA implementation, CDMA RANs that support CSFB may have RAN identifiers of a particular class, and CDMA RANs that do not support CSFB may have RAN identifiers of a different class. Thus, to determine whether it is within coverage of the second RAN, the WCD may scan for a RAN that is broadcasting as its identifier a RAN identifier indicating CSFB support. Alternatively, the first RAN may inform the WCD of an identifier of the second RAN (e.g., by specifying the second RAN's identifier in a SIB8), and the WCD may then determine whether it is within coverage of the second RAN by scanning for a RAN that is broadcasting as its identifier that specified identifier.

Figure 4:
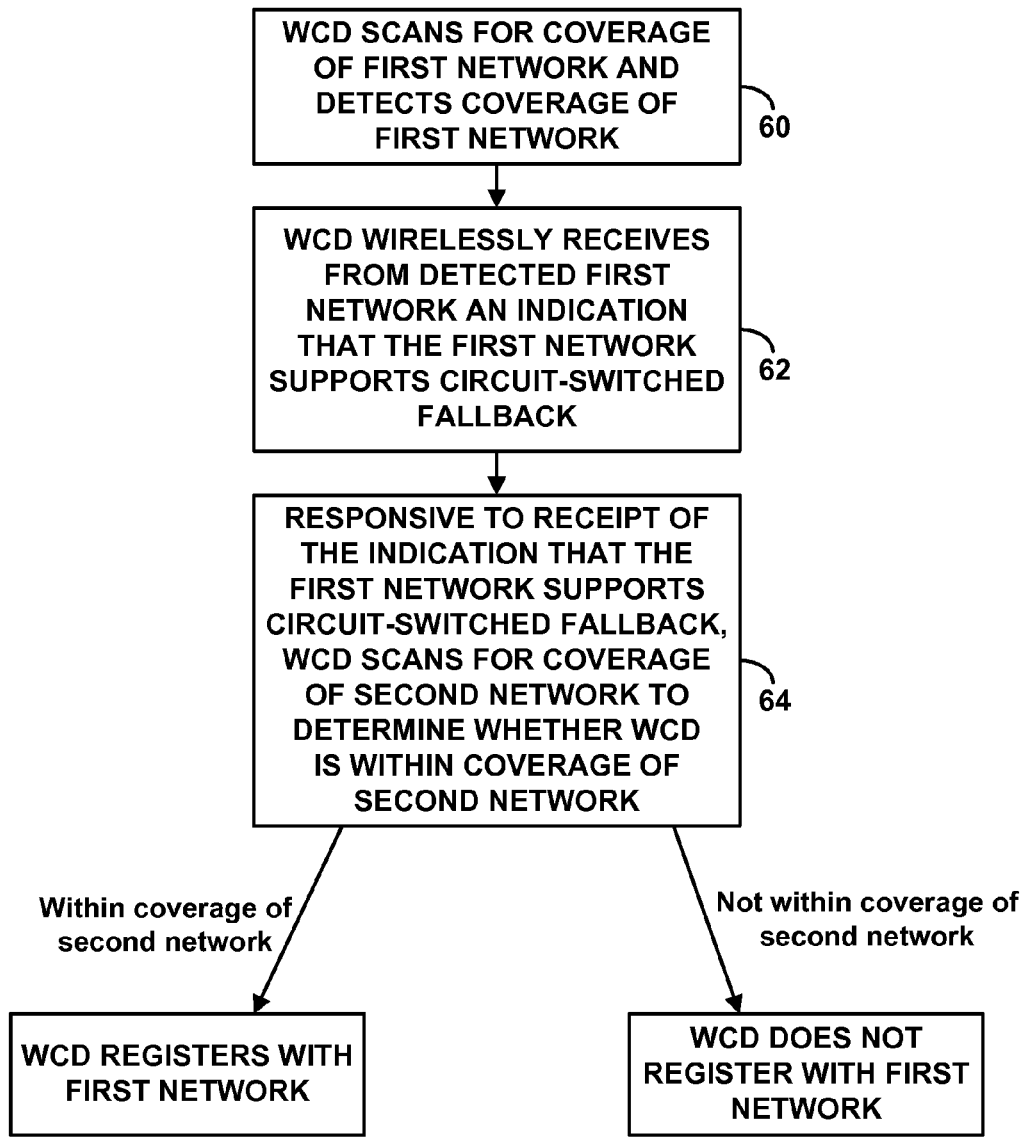
FIG. 4 is another flow chart depicting functions that can be carried out in accordance with an example method.

FIG. 4 is next another flow chart depicting functions that a representative WCD can carry out to help avoid the scenario where the WCD registers with RAN 12 (e.g., the LTE network) when WCD is not within coverage of associated RAN 14 (e.g., the CDMA network).

As shown in FIG. 4, at block 60, the WCD scans for coverage of a first network and detects coverage of the first network. At block 62, upon detecting the coverage of the first network, the WCD wirelessly receives from the first network an indication that the first network supports circuit-switched fallback. At block 64, responsive to receipt of the indication that the first network supports circuit-switched fallback, the WCD then scans for coverage of a second network to determine whether the WCD is within coverage of the second network. In turn, if the WCD detects coverage of the second network while the WCD is still within coverage of the first network, then, at block 66, the WCD registers with the first network (e.g., wirelessly transmits a registration request to the first network). On the other hand, if the WCD does not detect coverage of the second network, then, at block 68, the WCD does not register with the first network, notwithstanding the WCD's detecting coverage of the first network.

In line with the discussion above, in this method, the second network may broadcast data (e.g., a particular class of SID/NID) indicating that the second network supports circuit-switched fallback. And in that case, the act of the WCD scanning for coverage of the second network may involve the WCD scanning for broadcast of at least that data (i.e., scanning for a network that is broadcasting at least that data).

Figure 5:
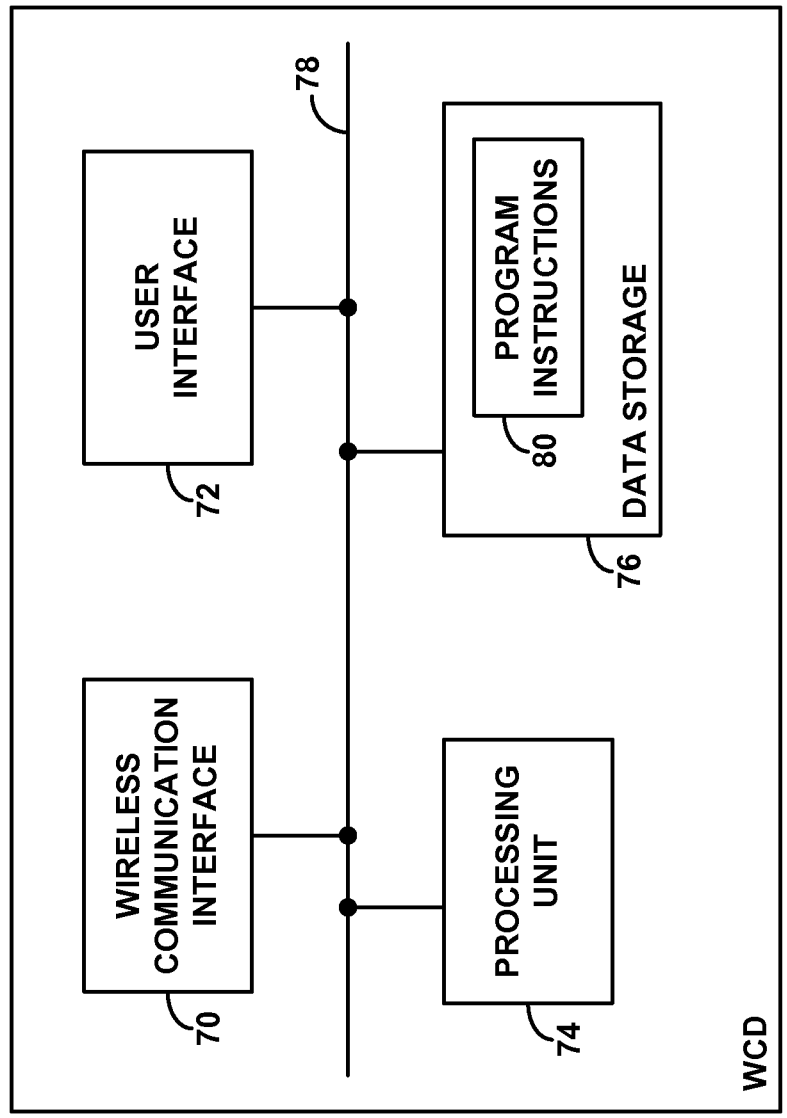
FIG. 5 is a simplified block diagram of a WCD arranged to implement an example method.

FIG. 5 is next a simplified block diagram of a WCD arranged to implement the present method. As shown in FIG. 5, the WCD includes a wireless communication interface 70, a user interface 72, a processing unit 74, and non-transitory data storage 76, all of which may be communicatively linked together by a system bus, network, or other connection mechanism 78. In such a WCD, functions of the present method could be carried out by the wireless communication interface (e.g., by hardware, firmware, and/or software logic that is part of the wireless communication interface) and/or by the processing unit programmed or otherwise arranged to carry out instructions to carry out the method functions or one or more other components (whether or not shown).

In practice, the wireless communication interface 70 may include an antenna structure and associated components (e.g., a mobile station modem chipset) for engaging in wireless communication with the first RAN 12 and the second RAN 14. As such, the wireless communication interface may comprise an integrated circuit that supports both air interface communication with the first RAN (e.g., LTE communication) and air interface communication with the second RAN (e.g., CDMA or GSM communication), or the wireless communication interface may comprise multiple interface modules, one for communicating with the first RAN and another for communicating with the second RAN.

The user interface 72 may then comprise various input components, such as a touch sensitive surface, a microphone, a camera, and a keypad, for receiving user input, and output components, such as a display screen and a speaker, for providing output to a user. Further, the user interface may include analog-to-digital circuitry for converting between analog input/output exchanged with a user and digital input/output for processing by the WCD. In practice, user interface 72 may support engaging in various communications such as those discussed above.

Processing unit 74 may then comprise one or more general purpose processors (e.g., microprocessors) and/or one or more special purpose processors (e.g., application specific integrated circuits) and may be integrated in whole or in part with wireless communication interface. And data storage 76 may comprise one or more volatile and/or non-volatile storage components, such as optical, magnetic, or flash memory. As shown, by way of example, data storage 76 may then comprise program instructions 80, which may be executable by processing unit 74 to carry out various WCD functions described herein.

In practice, such a WCD (e.g., the wireless communication interface) may be arranged to scan for and detect coverage of the first RAN and, responsive to detecting coverage of the first RAN, to register with the first RAN only if the WCD determines that the WCD is also within coverage of the second RAN. As such, the WCD (e.g., the wireless communication interface) may be arranged to scan for coverage of the second RAN to determine whether the WCD is also within coverage of the second RAN and (i) if so, to transmit a registration request to the first RAN but (ii) if not, to not transmit a registration request to the first RAN.

In line with the discussion above, the WCD may further be arranged to receive from the first RAN an indication that the first RAN supports circuit-switched fallback, and the WCD may be arranged to respond to receipt of that indication by determining whether the WCD is also within coverage of the second RAN.

Exemplary embodiments have been described above. Those skilled in the art will understand, however, that changes and modifications may be made to these embodiments without departing from the true scope and spirit of the invention.

We claim:

1. A method of managing registration by a wireless communication device (WCD), the method comprising:
   the WCD detecting that the WCD is within coverage of a first radio access network (RAN);
   the WCD making a determination of whether the WCD is also within coverage of the second RAN, and
   responsive to the detecting, the WCD registering with the first RAN only if the determination is that the WCD is also within coverage of the second RAN,
   wherein, registering with the first RAN only if the determination is that the WCD is also within coverage of the second RAN helps prevent a situation where the WCD registers with the first RAN but is then unable to transition from being served by the first RAN to being served by the second RAN.

2. The method of claim 1, wherein registering with the first RAN comprises wirelessly transmitting to the first RAN a request for the first RAN to register presence of the WCD in coverage of the first RAN.

3. The method of claim 1, further comprising the WCD wirelessly receiving from the first RAN an indication that the first RAN supports WCD registration with the second RAN through the first RAN.

4. The method of claim 3, wherein the indication is an indication that the first RAN supports circuit-switched-fallback.

5. The method of claim 3, wherein the WCD registering with the first RAN only if the WCD is also within coverage of a second RAN comprises conditioning registration of the WCD with the first RAN on the WCD determining that the WCD is also within coverage of the second RAN, wherein the conditioning is responsive to the WCD receiving the indication.

6. The method of claim 1, wherein the first RAN is a Long Term Evolution (LTE) RAN and wherein the second RAN is a circuit-switched RAN selected from the group consisting of a Code Division Multiple Access (CDMA) RAN and a Global System for Mobile Communications (GSM) RAN.

7. A wireless communication device (WCD) comprising:
a wireless communication interface arranged to exchange communications wirelessly with both a first radio access network (RAN) and a second RAN,
wherein the WCD is arranged to scan for and detect coverage of the first RAN, to make a determination of whether the WCD is also within coverage of the second RAN, and, responsive to detecting coverage of the first RAN, to register with the first RAN only if the determination is that the WCD is also within coverage of the second RAN,
wherein, registering with the first RAN only if the determination is that the WCD is also within coverage of the second RAN helps prevent a situation where the WCD registers with the first RAN but is then unable to transition from being served by the first RAN to being served by the second RAN.

8. The WCD of claim 7, wherein the WCD is further arranged to scan for coverage of the second RAN so as to make the determination of whether the WCD is also within coverage of the second RAN.

9. The WCD of claim 8, wherein the wireless communication interface is arranged to perform the scanning for coverage of the first RAN and the scanning for coverage of the second RAN.

10. The WCD of claim 8, wherein the WCD is arranged to receive from the first RAN an indication that the first RAN supports circuit-switched fallback.

11. The WCD of claim 10, wherein the WCD is arranged to make the determination of whether the WCD is also within coverage of the second RAN in response to the WCD receiving the indication.

12. The WCD of claim 7, wherein the first RAN is a Long Term Evolution (LTE) RAN and wherein the second RAN is a circuit-switched RAN selected from the group consisting of a Code Division Multiple Access (CDMA) RAN and a Global System for Mobile Communications (GSM) RAN.

13. The WCD of claim 7, further comprising a processing unit, wherein the processing unit is programmed to carry out the scanning, detecting, and registering.

14. A method comprising:
a wireless communication device (WCD) scanning for coverage of a first network and detecting the coverage of the first network;
upon detecting the coverage of the first network, the WCD wirelessly receiving from the first network an indication that the first network supports circuit-switched fallback; and
responsive to receipt of the indication that the first network supports circuit-switched fallback, the WCD scanning for coverage of a second network and (i) if the WCD detects coverage of the second network while the WCD is still within coverage of the first network, then the WCD registering with the first network, but (ii) if the WCD does not detect coverage of the second network, then the WCD not registering with the first network.

15. The method of claim 14, wherein the first network is a Long Term Evolution (LTE) network and wherein the second network is a network selected from the group consisting of a Code Division Multiple Access (CDMA) network and a Global System for Mobile Communications (GSM) network.

16. The method of claim 14, wherein the second network broadcasts data indicating that the second network supports circuit-switched fallback, and wherein scanning for coverage of the second network comprises scanning for broadcast of at least that data.

17. The method of claim 14, wherein registering with the first network comprises wirelessly transmitting a registration request to the first network.

18. The method of claim 14, further comprising:
if the WCD detects coverage of the second network while the WCD is still within coverage of the first network and the WCD registers with the first network, the WCD then also registering with the second network through the first network, wherein signaling for registration of the WCD with the second network passes through an interworking server (IWS).

19. The method of claim 3, further comprising:
after registering with the first RAN, the WCD registering with the second RAN through the first RAN, wherein signaling for registration of the WCD with the second RAN passes through an interworking server (IWS).

* * * * *